(12) United States Patent
Ishihara et al.

(10) Patent No.: US 12,152,640 B1
(45) Date of Patent: Nov. 26, 2024

(54) CAM CLUTCH

(71) Applicant: TSUBAKIMOTO CHAIN CO., Osaka (JP)

(72) Inventors: Yuma Ishihara, Osaka (JP); Hirokazu Tsuneda, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/606,288

(22) Filed: Mar. 15, 2024

(30) Foreign Application Priority Data

Jun. 13, 2023 (JP) ................................. 2023-097175

(51) Int. Cl.
*F16D 41/07* (2006.01)
*F16D 41/067* (2006.01)

(52) U.S. Cl.
CPC ........... *F16D 41/07* (2013.01); *F16D 41/067* (2013.01); *F16D 2200/0056* (2013.01)

(58) Field of Classification Search
CPC .................. F16D 41/07; F16D 41/067; F16D 2200/0056; F16D 41/073
See application file for complete search history.

(56) References Cited

U.S. PATENT DOCUMENTS

| | | | |
|---|---|---|---|
| 2019/0055998 A1* | 2/2019 | Bauman | F16D 41/067 |
| 2020/0400203 A1* | 12/2020 | Shimanaka | F16H 57/0473 |
| 2022/0056963 A1* | 2/2022 | Nakagawa | F16D 41/084 |
| 2023/0341011 A1* | 10/2023 | Brzus | F16C 19/26 |

FOREIGN PATENT DOCUMENTS

JP 2011-12762 A 1/2011

* cited by examiner

*Primary Examiner* — Jacob S. Scott
*Assistant Examiner* — Farhana Pervin
(74) *Attorney, Agent, or Firm* — WHDA, LLP

(57) ABSTRACT

In the present invention, a cage ring that holds cams and rollers is configured such that an outer race-side portion of one axial end portion of the rollers is held in a state of protruding radially outward with respect to an outer peripheral surface of the cage ring, roller pocket parts are formed such that both end portions of the rollers are held in a state of respectively protruding axially outward with respect to axial end faces of the cams held by cam pocket parts, and a column part formed between adjacent pocket parts are formed such that an opposite axial end portion on the inner peripheral surface side thereof is located axially inward with respect to an opening edge position on an opposite axial end side of the roller pocket parts.

6 Claims, 8 Drawing Sheets

CAM CLUTCH

BACKGROUND OF THE INVENTION

1. Field of the Invention

The present invention relates to a cam clutch that transmits and interrupts rotational torque.

2. Description of the Related Art

Cam clutches in which a plurality of rollers are disposed between an inner race and an outer race, in order to engage all of a plurality of cams disposed between the inner race and the outer race simultaneously with equal load sharing while maintaining the concentricity of the inner race and the outer race, and also in order to bear radial load that is applied to the outer race or the inner race are known (e.g., see Japanese Patent Application Publication No. 2011-012762A).

The clutch described in Japanese Patent Application Publication No. 2011-012762A includes an outer race and an inner race, a plurality of sprags and a plurality of rollers that are disposed in the circumferential direction between the outer race and the inner race, a retainer that holds the sprags in the circumferential direction, and an elastic member that biases the sprags.

The retainer includes a pair of annular parts and column parts that extend in the axial direction so as to connect the annular parts, and pocket parts that house the sprags and pocket parts that house the rollers are constituted by the spaces between the column parts adjacent to each other in the circumferential direction.

SUMMARY OF THE INVENTION

In the above clutch, relative axial movement of the rollers and cams is restricted, when the rollers and cams are housed in the pocket parts, due to the annular parts of the retainer being on the outer side with respect to axial end portions of the rollers and cams, and the rollers and cams being held in the axial direction by these annular parts.

Thus, with the above clutch, the cage ring does not need to bear axial load, but ensuring rigidity that withstands load is difficult in reality. In particular, the cage ring is often made of a resin material in consideration of factors such as productivity and weight reduction, and such problems occur noticeably in the case of resin cage rings.

In response to such problems, it is conceivable to dispose additional members for bearing axial load, but a large space is required for this purpose.

The present invention has been made based on such circumstances, and an object thereof is to provide a cam clutch that is able to achieve an increase in allowable axial load with a simple structure, without adopting measures such as enhancing the rigidity of the cage ring or disposing separate members, and is capable of realizing miniaturization and weight reduction.

The present invention solves the above problem by providing a cam clutch including: an outer race and an inner race provided to be relatively rotatable on the same axis; a plurality of cams and a plurality of rollers disposed so as to be arranged in a circumferential direction between the outer race and the inner race; a cage ring having a plurality of cam pocket parts corresponding one-to-one to the plurality of cams and a plurality of roller pocket parts corresponding one-to-one to the plurality of rollers; and an annular spring biasing each of the plurality of cams so as to come into contact with the outer race and the inner race, and biasing each of the plurality of rollers so as to be pressed against the outer race or the inner race. The cage ring is configured to hold the rollers in a state where an outer race-side portion of one axial end portion of the rollers protrudes radially outward with respect to an outer peripheral surface of the cage ring. The roller pocket parts are formed so as to hold the rollers in a state where both end portions of the rollers respectively protrude axially outward with respect to axial end faces of the cams held in the cam pocket parts. Also, a column part formed between adjacent pocket parts is formed such that an opposite axial end portion on an inner peripheral surface side thereof is located axially inward with respect to an opening edge position on an opposite axial end side of the roller pocket parts.

With the invention according to claim 1, both end portions of the rollers are contactable with the inner race and the outer race in the axial direction, due to an outer race-side portion of one axial end portion of the rollers protruding radially outward with respect to the outer peripheral surface of the cage ring and the opposite axial end portion of the rollers protruding outward with respect to the opposite axial end portion of the column parts, with the rollers held by the cage ring, thus enabling the rollers to bear axial load from the outer race or the inner race. Thus, it is possible to achieve an increase in allowable axial load with a simple structure, without adopting measures such as enhancing the rigidity of the cage ring.

Also, because both end faces of the rollers can be exposed in the axial direction within the lengthwise region of the cage ring in the axial direction, it is possible to realize a structure in which the rollers can bear axial load, without increasing the axial length of the cam clutch.

Furthermore, because existing rollers and cams can be repurposed without major changes in shape or the like, a rise in manufacturing costs can be suppressed.

With the invention according to claim 2, one end portion of the cage ring is disposed between the inner peripheral surface of an outer race-side roller abutting part and the outer peripheral surface of the inner race, and the opposite end portion of the cage ring is disposed between the outer peripheral surface of an inner race-side roller abutting part and the inner peripheral surface of the outer race, and the outer race-side roller abutting part is abutted against one end face of the rollers and the inner race-side roller abutting part is abutted against the opposite end face of the rollers, whereby the space between the outer race and the inner race can be effectively utilized to dispose the cage ring. Thus, it becomes possible to realize a structure in which the rollers reliably bear axial load in a limited space, and to realize miniaturization of the cam clutch.

With the invention according to claim 3, due to the outer race having an outer race-side roller abutting part on both axial end portions thereof and the inner race having an inner race-side roller abutting part on both axial end portion thereof, the outer race-side roller abutting parts and the inner race-side roller abutting parts are abutted against the end faces of the rollers so as to sandwich the rollers in the axial direction, whereby it becomes possible for the rollers to bear bidirectional axial load.

With the invention according to claim 4, the outer race-side roller abutting part is constituted by an inward flange part integrally formed with the outer race, and the inner race-side roller abutting part is constituted by an outward flange part integrally formed with the inner race, whereby it becomes possible for the cam clutch itself to bear axial load. Thus, an increase in allowable axial load can be reliably achieved with a simple structure, without disposing a separate member for bearing axial load.

With the invention according to claim 5, the rollers have, on both end portions thereof, a chamfered part having a C-chamfered shape or an R-chamfered shape, and a roller contacting surface of the outer race-side roller abutting part and a roller contacting surface of the inner race-side roller abutting part are formed in a tapered shape or a circular arc cross-sectional shape, whereby the outer race and the inner race abut against the rollers at a contact angle in the axial direction. Thus, a component force acts in the radial direction when axial load is applied, whereby it becomes possible to reduce drag torque, due to the rollers coming into rolling-sliding contact with the outer race and the inner race.

With the invention according to claim 6, the cage ring is made of a resin material, whereby manufacturing of a lightweight cage ring is facilitated, and it becomes possible to realize weight reduction of the cam clutch.

DESCRIPTION OF THE PREFERRED EMBODIMENTS

First Embodiment

Figure 1:
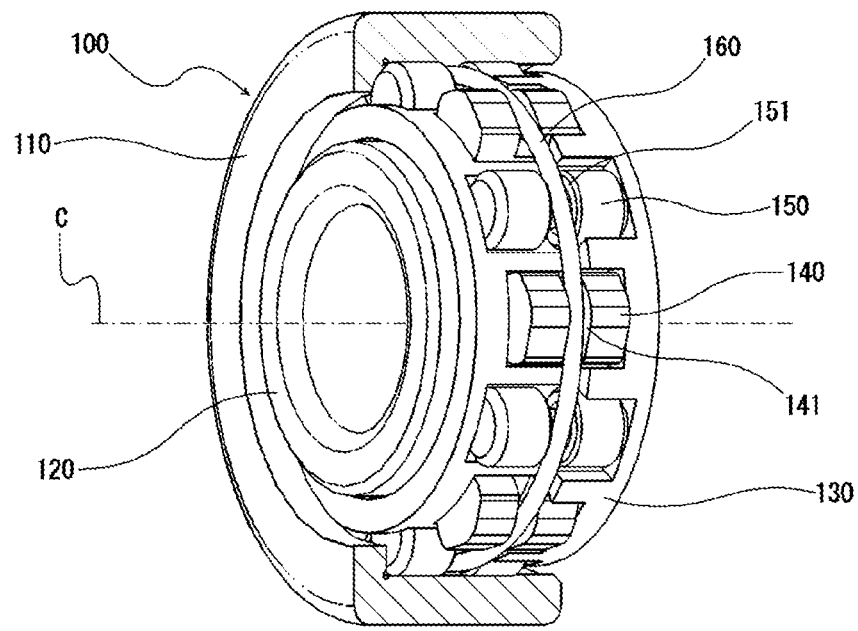
FIG. 1 is a perspective view showing an example configuration of a cam clutch according to a first embodiment of the present invention, with an outer race partially cut away.
Figure 2:
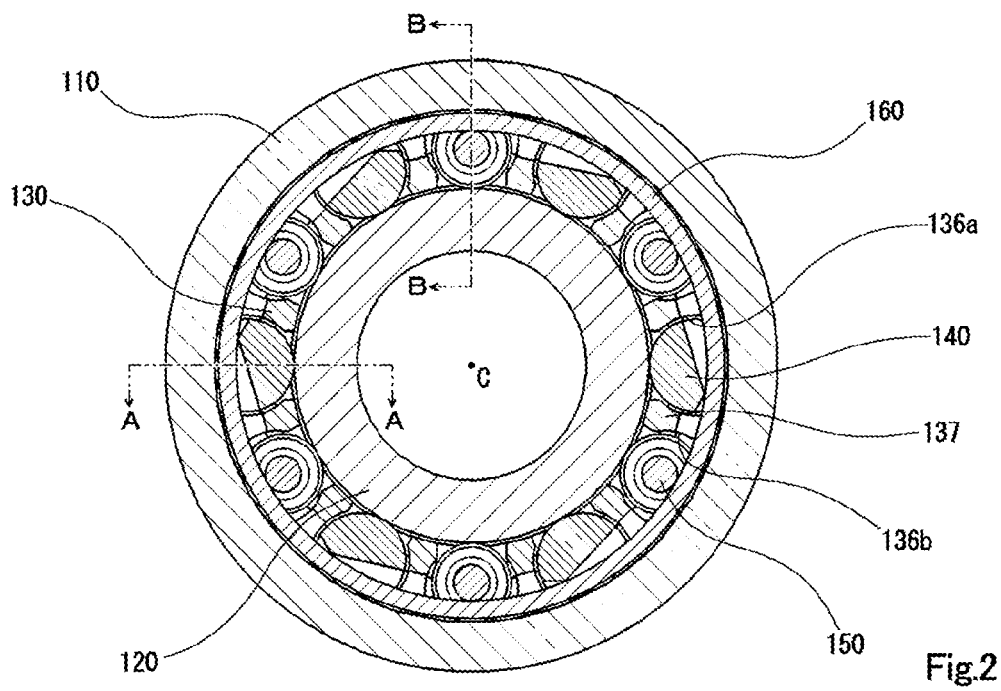
FIG. 2 is a cross-sectional view perpendicular to the rotational axis taken at an axial middle position of the cam clutch shown in FIG. 1.
Figure 3:
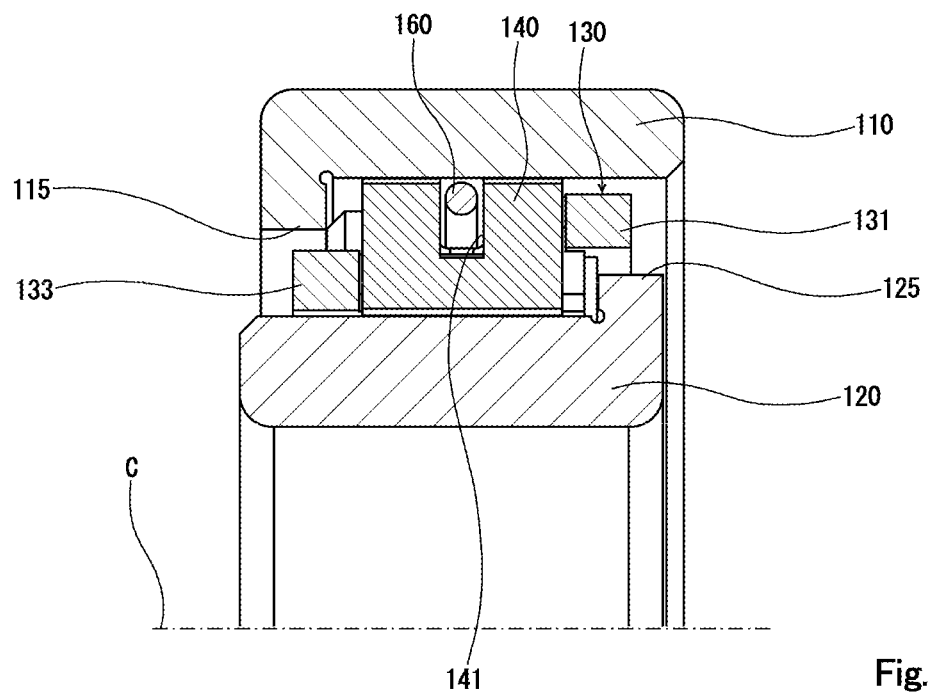
FIG. 3 is a cross-sectional view taken along line A-A in FIG. 2.
Figure 4:
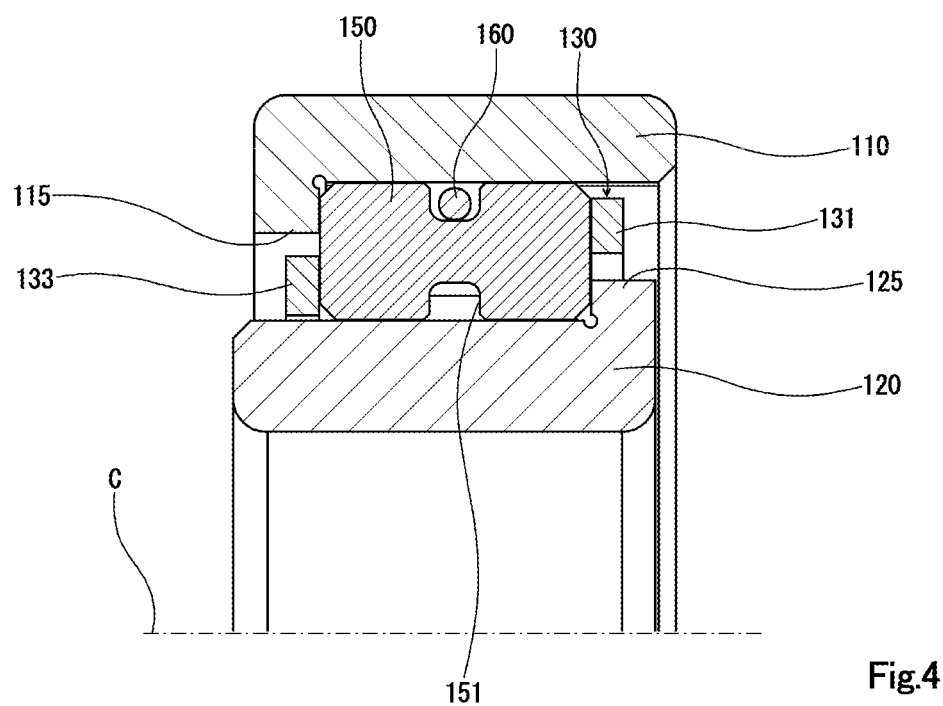
FIG. 4 is a cross-sectional view taken along line B-B in FIG. 2.

As shown in FIGS. 1 to 4, a cam clutch 100 according to a first embodiment of the present invention includes an outer race 110 and an inner race 120 that are provided to be relatively rotatable on the same axis, a cage ring 130 disposed on the same axis as the outer race 110 and the inner race 120 between the outer race 110 and the inner race 120, a plurality of cams 140 and a plurality of rollers 150 that are held by the cage ring 130 and disposed so as to be arranged in the circumferential direction in an annular space between the inner peripheral surface of the outer race 110 and the outer peripheral surface of the inner race 120, and an annular spring 160 that biases each of the plurality of cams 140 so as to come into contact with the outer race 110 and the inner race 120, and biases each of the plurality of rollers 150 so as to be pressed against the inner race 120. Reference sign C in FIGS. 1 to 4 denotes the rotational axis.

In the outer race 110 of the present embodiment, an inward flange part that protrudes radially inward and extends around the entire periphery in the circumferential direction is integrally formed on one axial end portion thereof, and this inward flange part constitutes an outer race-side roller abutting part 115 that abuts one end face of the rollers 150.

In the inner race 120 of the present embodiment, an outward flange part that protrudes radially outward and extends around the entire periphery in the circumferential direction is integrally formed on an opposite axial end portion thereof, and this outward flange part constitutes an inner race-side roller abutting part 125 that abuts against an opposite end face of the rollers 150 such that the rollers 150 are sandwiched in the axial direction between the outer race-side roller abutting part 115 and the inner race-side roller abutting part 125.

Figure 5:
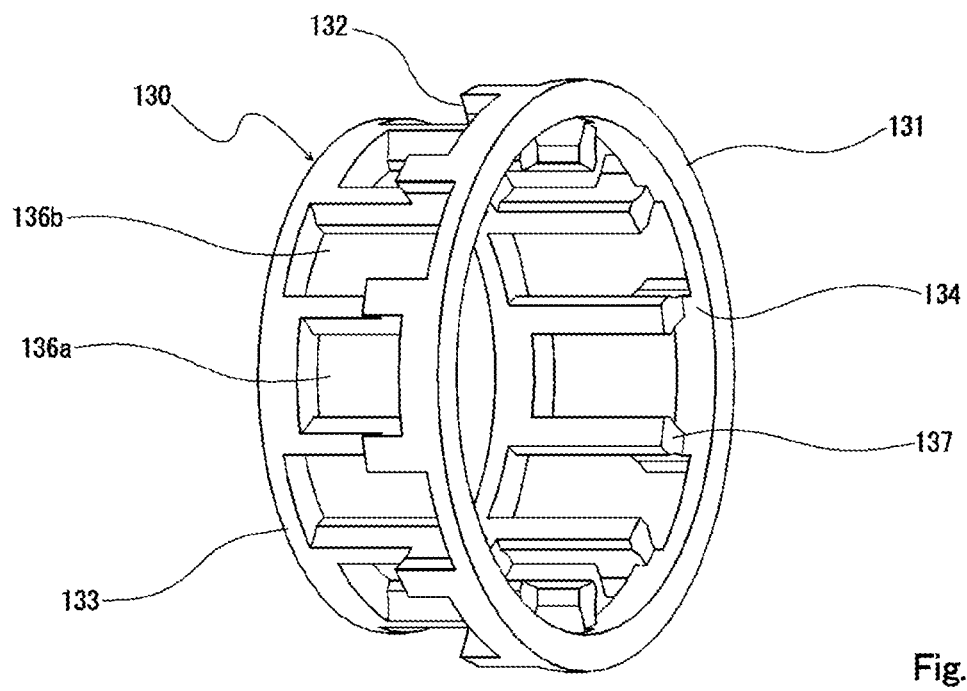
FIG. 5 is a perspective view showing the configuration of a cage ring.
Figure 6:
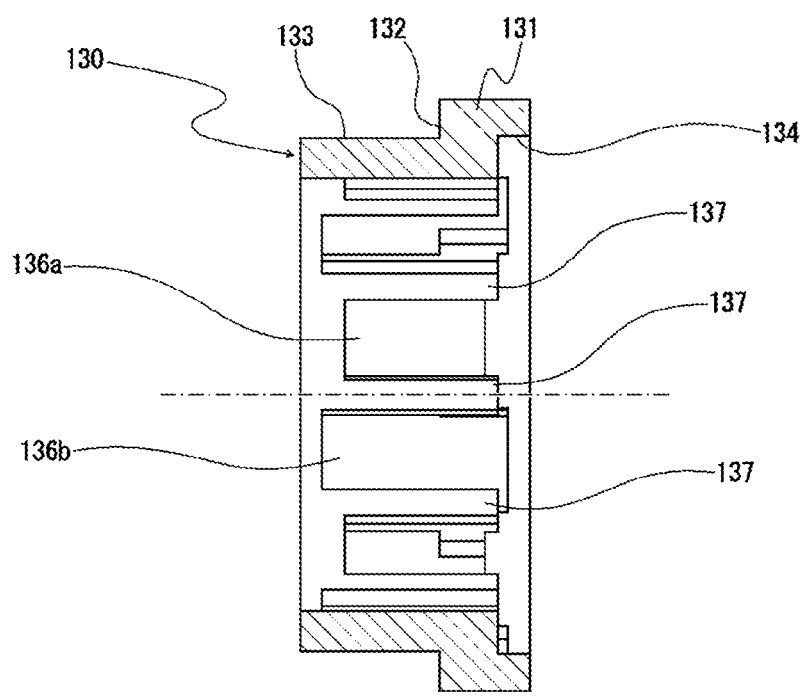
FIG. 6 is a cross-sectional view taken along the rotational axis of the cage ring shown in FIG. 5.

As shown in FIGS. 5 and 6, the cage ring 130 of the present embodiment has a large-diameter tubular part 131 and a small-diameter tubular part 133 that is axially continuous with one end of the large-diameter tubular part 131 via a stepped part 132, and is constituted so as to form a two-tiered cylindrical shape with the stepped part 132 provided in the middle thereof in the axial direction.

In the cage ring 130, a cam pocket part 136a corresponding to each of the plurality of cams 140 and a roller pocket part 136b corresponding to each of the plurality of rollers 150 are formed to extend in the axial direction from the large-diameter tubular part 131 to the small-diameter tubular part 133, and to pass through in the radial direction from the outer peripheral side to the inner peripheral side.

Accordingly, the cam pocket parts 136a and the roller pocket parts 136b are constituted to respectively house the cams 140 and the rollers 150, in a state where one axial end portion of the cams 140 and rollers 150 protrudes radially outward with respect to the outer peripheral surface of the small-diameter tubular part 133. Thus, when the cams 140 and rollers 150 are respectively housed in the corresponding cam pocket parts 136a and roller pocket parts 136b, an outer race-side portion of one axial end face thereof is exposed in the axial direction.

The cam pocket parts 136a and the roller pocket parts 136b are constituted in a shape respectively surrounding the cams 140 and the rollers 150 on four sides in plan view from the radial direction, such that circumferential movement and axial movement of the cams 140 and the rollers 150 are restricted.

Also, a cam support surface and a roller support surface of a column part 137 formed between adjacent cam pocket parts 136a and roller pocket parts 136b are formed in a shape that restricts the movement of the cams 140 and the rollers 150 to the inner race side.

In the present embodiment, six roller pocket parts 136b are formed such that six rollers 150 are disposed equidistantly from each other in the circumferential direction, and six cam pocket parts 136a are formed such that one cam 140 is located between every two adjacent rollers 150 and six cams 140 are disposed at a predetermined interval from each other.

In this cam clutch 100, provision of the rollers 150 enables the concentricity of the outer race 110 and the inner race 120 to be held and radial load to be supported, without using other members such as bearings, and the number of rollers 150 is not particularly limited, and need only be at least three or more. Also, the number and disposition pattern of the cams 140 are not particularly limited, and can be changed as appropriate according to purpose.

Figure 7:
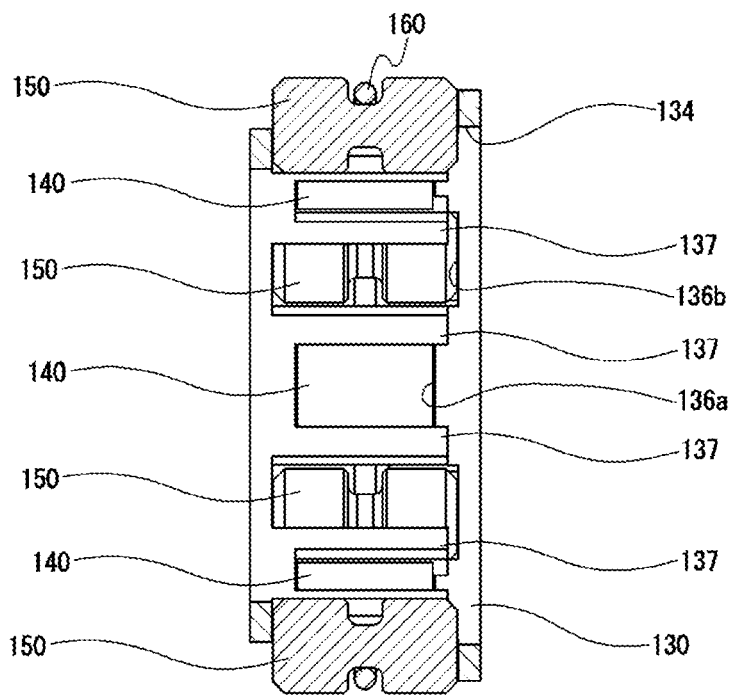
FIG. 7 is a cross-sectional view taken along the rotational axis showing a state in which cams and rollers are held by the cage ring.

As also shown in FIG. 7, the roller pocket parts 136b are formed so as to hold the rollers 150, with both end portions of the rollers 150 respectively protruding axially outward with respect to the axial end faces of the cams 140 housed in the cam pocket parts 136a.

The plurality of cams 140 each have, in the middle thereof in the axial direction, a groove part 141 that can engage with the spring 160.

In the present embodiment, the bottom portion of the groove part 141 has an inclined shape forming a raised part at an eccentric position, and the cams 140 are oscillated in a direction that brings the cams 140 into contact with the outer race 110 and the inner race 120 due to the spring 160 pressing on the raised part at the bottom portion of the groove part 141.

The plurality of rollers 150 are constituted to be larger than the cams 140 in axial length, and have a groove part 151 that can engage with the spring 160 in the middle thereof in the axial direction. Outer peripheral edge portions of the groove part 151 is chamfered, and the spring 160 is prevented from catching.

The spring 160 is strung around the groove parts 141 of the cams 140 and the groove parts 151 of the rollers 150 so as to restrict movement of the cams 140 and the rollers 150 to the outer race side, and is locked in place by the stepped part 132 of the cage ring 130.

In the cam clutch 100, a countersunk-shaped recessed part 134 is formed on an opposite end-side opening part of the large-diameter tubular part 131 in the cage ring 130. As shown in FIG. 6, the recessed part 134 is formed such that the bottom surface thereof is located axially inward with respect to the axial position of the opposite end-side opening end edge of the roller pocket parts 136b, and an opposite axial end portion on the inner peripheral surface side of the column parts 137 is thereby located axially inward with respect to the opening edge position on the opposite axial end side of the roller pocket parts 136b. Thus, as shown in FIG. 7, when the rollers 150 are housed in the roller pocket parts 136b, an inner race-side portion of the opposite axial end face of the rollers 150 is exposed in the axial direction, and the outer race 110 and the inner race 120 can be brought into contact with the rollers 150 in the axial direction.

In this way, both end faces of the rollers 150 can be exposed in the axial direction within the lengthwise region of the cage ring 130 in the axial direction, and thus it is possible to realize a structure in which the rollers 150 can bear axial load, without increasing the axial length of the cam clutch 100.

One end portion of the small-diameter tubular part 133 in the cage ring 130 is disposed between the inner peripheral surface of the outer race-side roller abutting part 115 and the outer peripheral surface of the inner race 120, and the opposite end portion of the large-diameter tubular part 131 in the cage ring 130 is disposed between the outer peripheral surface of the inner race-side roller abutting part 125 and the inner peripheral surface of the outer race 110, whereby the outer race-side roller abutting part 115 is abutted against one end face of the rollers 150 and the inner race-side roller abutting part 125 is abutted against the opposite end face of the rollers 150. The space between the outer race 110 and the inner race 120 is thereby effectively utilized, and it becomes possible for the rollers 150 to bear unidirectional axial load from the outer race 110 or the inner race 120 in a limited space. Thus, an increase in allowable axial load is achieved with a simple structure, without adopting measures such as enhancing the rigidity of the cage ring 130 or disposing a separate member for bearing axial load, and miniaturization of the cam clutch 100 is also achieved. Also, because the cams 140 and the rollers 150 can be repurposed without major changes in shape or the like, it is possible to suppress an increase in manufacturing costs.

As described above, in the cam clutch 100, the outer race 110 and the inner race 120 only contact the rollers 150 in the axial direction and do not contact the cams 140 or the cage ring 130 in the axial direction, whereby it is possible for the rollers 150 to bear axial load. Thus, the cage ring 130 need only have a rigidity that allows for position restriction and retention of the cams 140 and the rollers 150, and it becomes possible for the cage ring 130 to be made of a resin material. By forming the cage ring 130 with a resin material, manufacturing of a lightweight cage ring 130 is facilitated, and it is possible to realize weight reduction of the cam clutch 100.

In the above embodiment, a configuration was described in which axial load is born by the flat end faces of the rollers, but axial load may be born obliquely by a surface that inclines to the axial direction.

Figure 8:
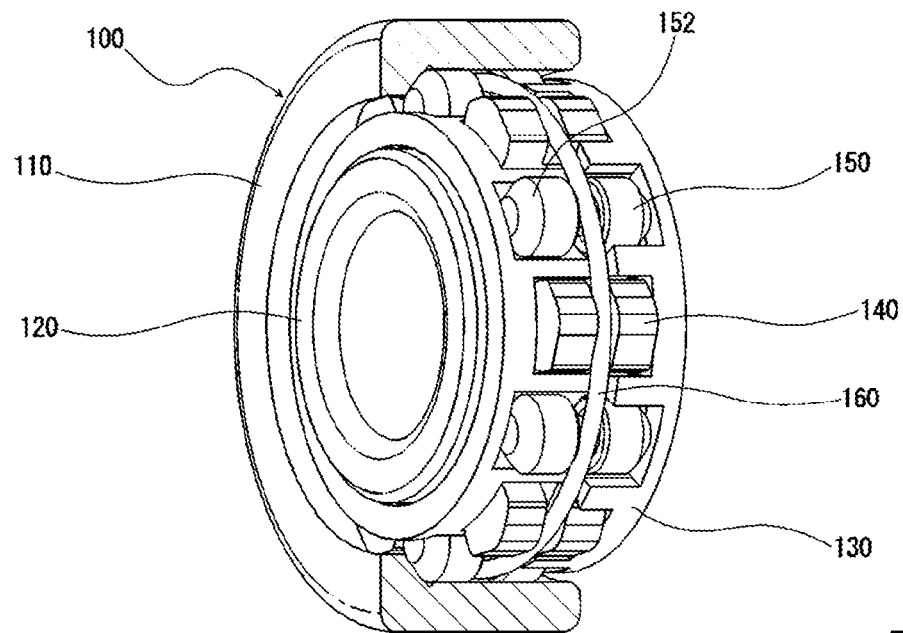
FIG. 8 is a perspective view showing another example configuration of a cam clutch according to the first embodiment of the present invention, with an outer race partially cut away.
Figure 9:
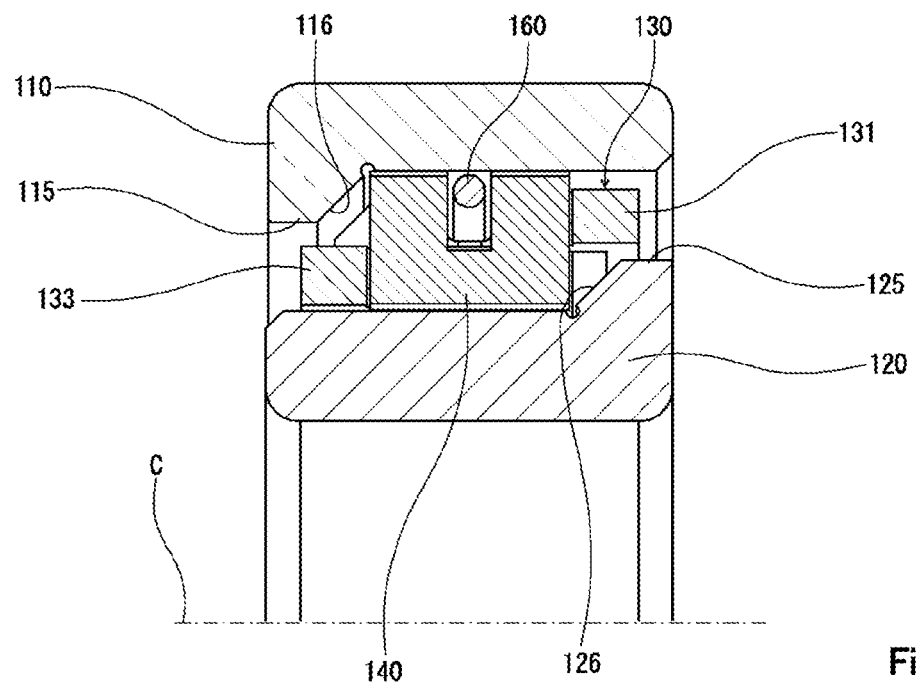
FIG. 9 is a partial cross-sectional view taken along a plane including the rotational axis and the oscillation center axis of a cam in the cam clutch shown in FIG. 8.
Figure 10:
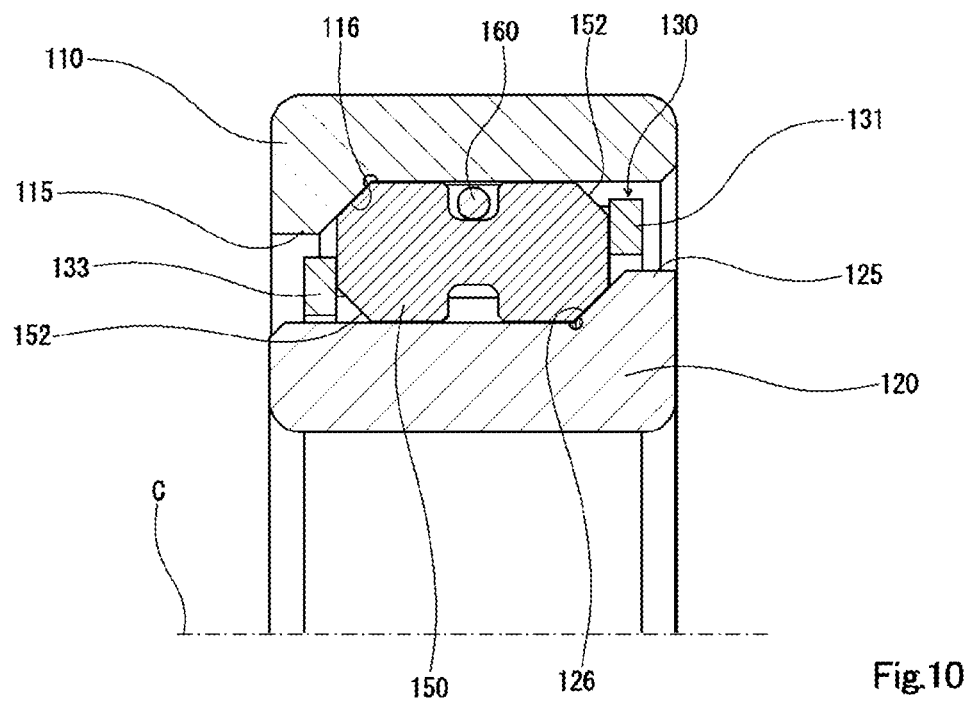
FIG. 10 is a partial cross-sectional view taken along a plane including the rotational axis and the center axis of a roller in the cam clutch shown in FIG. 8.

FIG. 8 is a perspective view showing another example configuration of a cam clutch according to the first embodiment of the present invention, with the outer race partially cut away, FIG. 9 is a partial cross-sectional view taken along a plane including the rotational axis and the oscillation center axis of a cam in the cam clutch shown in FIG. 8, and FIG. 10 is a partial cross-sectional view taken along a plane including the rotational axis and the center axis of a roller in the cam clutch shown in FIG. 8.

This cam clutch 100 has the same configuration as the cam clutch 100 described above, apart from differences in the configuration of the rollers 150 and the configurations of the outer race-side roller abutting part 115 and the inner race-side roller abutting part 125.

The rollers 150 have, on both end portions thereof, a chamfered part 152 having a C-chamfered shape and constituted to decrease in diameter in an axially outward direction, and are constituted such that the chamfered parts 152 are exposed in the axial direction when housed in the roller pocket parts 136b of the cage ring 130.

In the outer race 110, an inward flange part that protrudes radially inward and extends around the entire periphery in the circumferential direction is integrally formed on one axial end portion thereof, and this inward flange part constitutes an outer race-side roller abutting part 115 that abuts against one end face of the rollers 150.

In the present embodiment, an inner surface 116 constituting a roller contacting surface of the outer race-side roller abutting part 115 is formed in a tapered shape so as to extend at an angle on the inner race side proceeding toward one axial end side.

In the inner race 120, an outward flange part that protrudes radially outward and extends around the entire periphery in the circumferential direction is integrally formed on an opposite axial end portion thereof, and this outward flange part constitutes an inner race-side roller abutting part 125 that abuts against the opposite end face of the rollers 150 such that the rollers 150 are sandwiched in the axial direction between the outer race-side roller abutting part 115 and the inner race-side roller abutting part 125.

In the present embodiment, an inner surface 126 constituting a roller contacting surface of the inner race-side roller abutting part 125 is formed in a tapered shape so as to extend at an angle on the outer race side proceeding toward the opposite axial end side.

With the cam clutch 100 having such a configuration, when the one end portion of the small-diameter tubular part 133 is disposed between the inner peripheral surface of the outer race-side roller abutting part 115 and the outer peripheral surface of the inner race 120, and the opposite end portion of the large-diameter tubular part 131 is disposed between the outer peripheral surface of the inner race-side roller abutting part 125 and the inner peripheral surface of the outer race 110, the outer race-side roller abutting part 115 of the outer race 110 and the inner race-side roller abutting part 125 of the inner race 120 abut against the rollers 150 at a contact angle in the axial direction. Thus, a component force acts in the radial direction when axial load is applied, whereby it becomes possible to reduce drag torque, due to the rollers 150 coming into rolling and sliding contact with the outer race 110 and the inner race 120.

Figure 11:
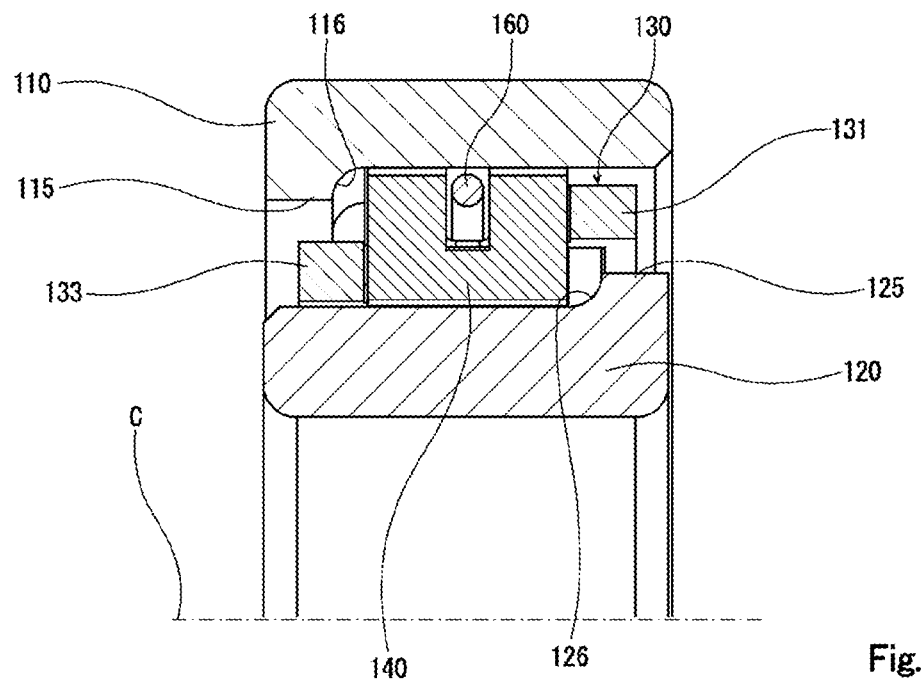
FIG. 11 is a partial cross-sectional view taken along a plane including the rotational axis and the oscillation center axis of a cam in yet another example configuration of a cam clutch according to the first embodiment of the present invention.
Figure 12:
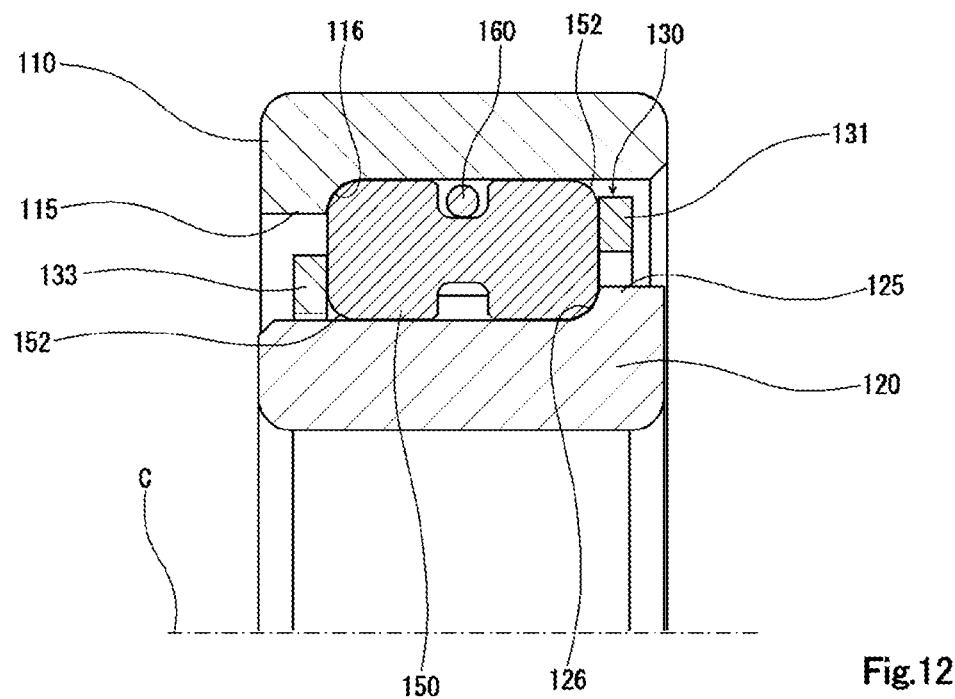
FIG. 12 is a partial cross-sectional view taken along a plane including the rotational axis and the center axis of a roller in the cam clutch shown in FIG. 11.

Also, even in the case where, as shown in FIGS. 11 and 12, the chamfered parts 152 of both end portions of the rollers 150 are formed in an R-chamfered shape, and the inner surface 116 constituting the roller contacting surface of the outer race-side roller abutting part 115 and the inner surface 126 constituting the roller contacting surface of the inner race-side roller abutting part 125 are formed in a circular arc cross-sectional shape, it is possible to obtain similar effects to those described above.

Hereinabove, a configuration was described in which the roller abutting parts are integrally formed with the outer race and the inner race by constituting the roller abutting parts with flange parts, but the outer race-side roller abutting part and the inner race-side roller abutting part need not be integrally formed with the outer race and the inner race, and a configuration may be adopted in which separate members that abut against the end faces of the rollers are provided in a state where axial movement is prohibited.

Also, a configuration was described in which the cage ring is formed in a two-tiered cylindrical shape, but the cage ring need only be constituted so as to axially expose an outer race-side portion of the one end face of the rollers and an inner race-side portion of the opposite end face of the rollers when the rollers are housed in roller pocket parts. For example, a configuration may be adopted in which the cage ring is constituted by a cylindrical member having a uniform thickness in the axial direction, and a stepped part extending around the entire periphery in the circumferential direction is formed on the outer peripheral surface of the one end portion of the cylindrical member so as to expose an outer race-side portion of the one end face of the rollers in the axial direction, and a countersunk-shaped recessed part is formed in the opposite end-side opening part of the cylindrical member so as to expose an inner race-side portion of the opposite end face of the rollers in the axial direction.

Second Embodiment

With the cam clutch according to the first embodiment, the rollers bear unidirectional axial load, whereas, hereinafter, a cam clutch will be described in which the rollers are capable of bearing bidirectional axial load.

Figure 13:
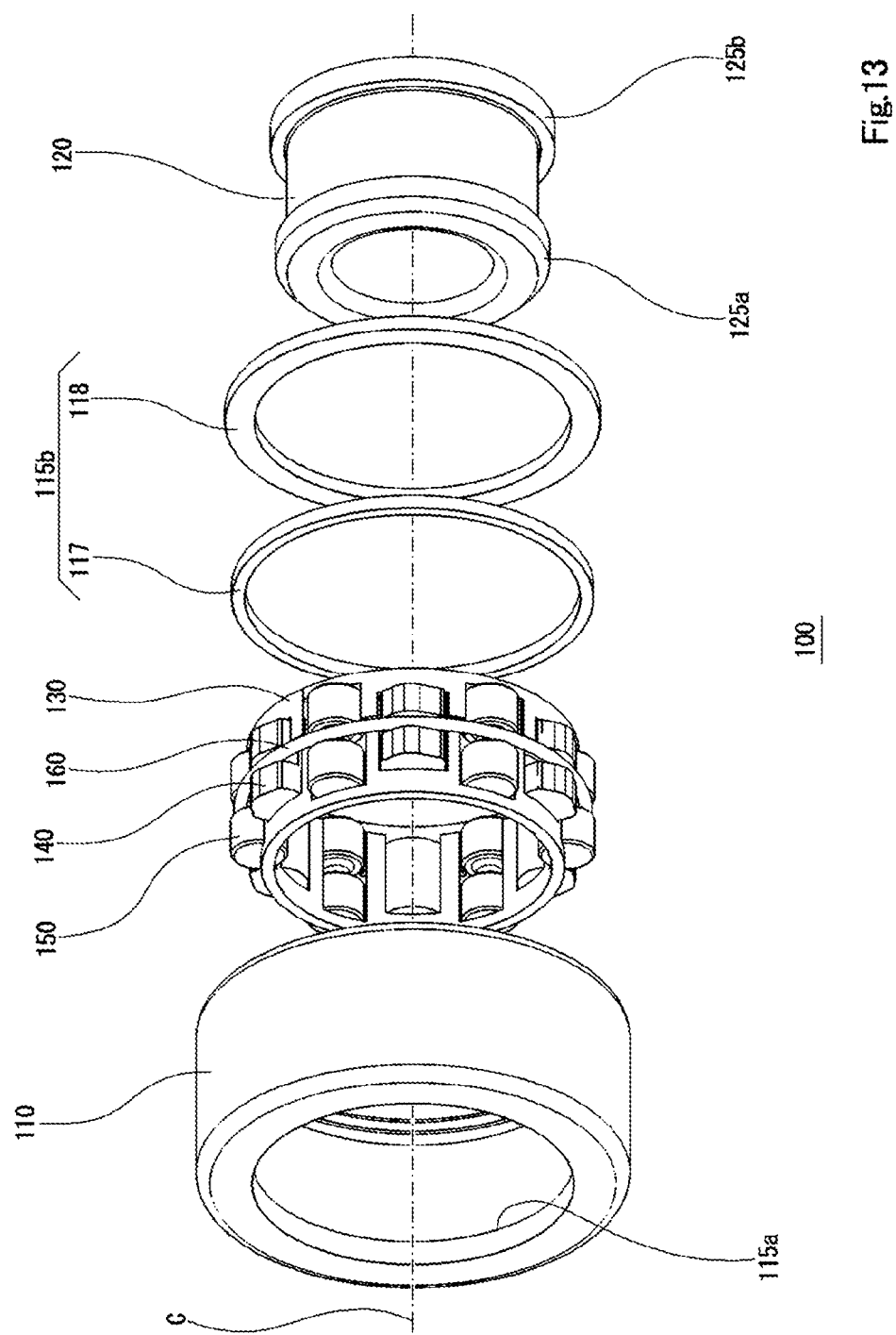
FIG. 13 is an exploded perspective view showing an example configuration of a cam clutch according to a second embodiment of the present invention.
Figure 14:
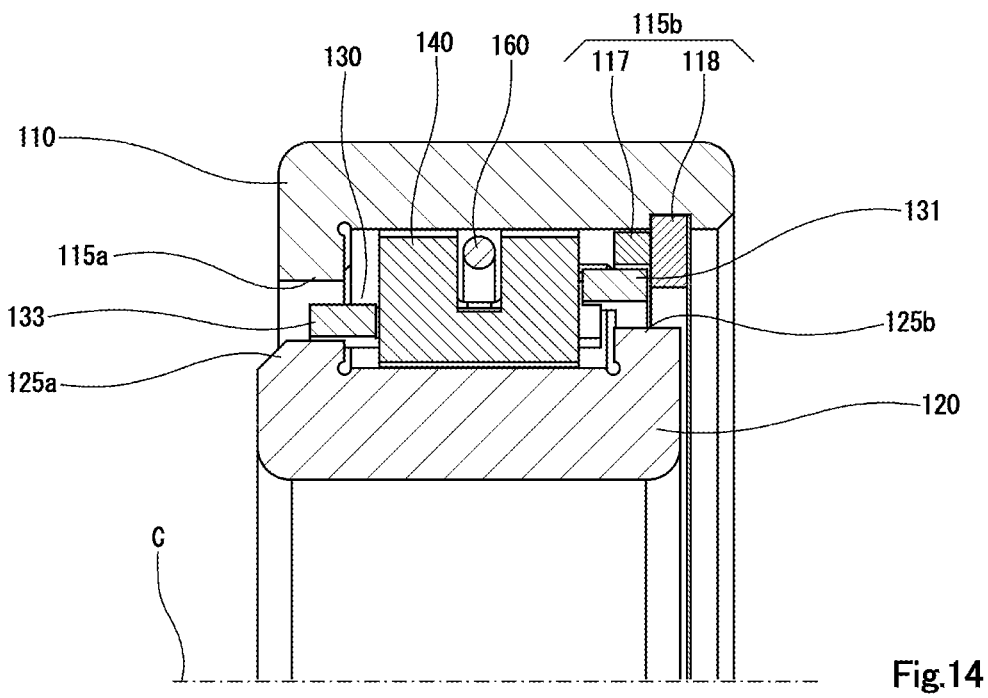
FIG. 14 is a partial cross-sectional view taken along a plane including the rotational axis and the oscillation center axis of a cam in the cam clutch shown in FIG. 13.
Figure 15:
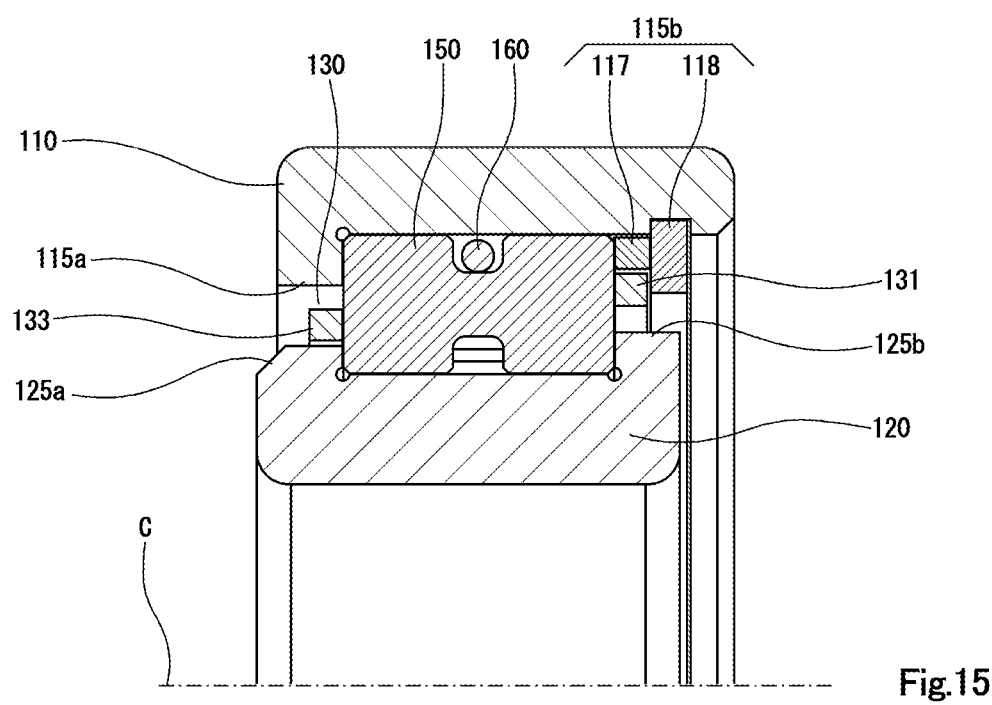
FIG. 15 is a partial cross-sectional view taken along a plane including the rotational axis and the center axis of a roller in the cam clutch shown in FIG. 13.

As shown in FIGS. 13 to 15, a cam clutch 100 according to a second embodiment includes an outer race 110 and an inner race 120 that are provided to be relatively rotatable on the same axis, a cage ring 130 disposed on the same axis as the outer race 110 and the inner race 120 between the outer race 110 and the inner race 120, a plurality of cams 140 and a plurality of rollers 150 that are held by the cage ring 130 and disposed so as to be arranged in the circumferential direction in an annular space between the inner peripheral surface of the outer race 110 and the outer peripheral surface of the inner race 120, an annular spring 160 that biases each of the plurality of cams 140 so as to come into contact with the outer race 110 and the inner race 120, and biases each of the plurality of rollers 150 so as to be pressed against the inner race 120, a supporting plate 117 disposed between the outer race 110 and the inner race 120 so as to abut the opposite end face of the rollers 150, and a retaining ring 118 that restricts axial movement of the supporting plate 117. Reference sign C in FIGS. 13 to 15 denotes the rotational axis.

In the outer race 110 of the present embodiment, an inward flange part that protrudes radially inward and extends around the entire periphery in the circumferential direction is integrally formed on one axial end portion thereof, and this inward flange part constitutes a first outer race-side roller abutting part 115a that abuts one end face of the rollers 150.

A groove part extending around the entire periphery in the circumferential direction is formed in the inner peripheral surface of the opposite end portion of the outer race 110, and the circular plate-shaped retaining ring 118 is fitted into this groove part, whereby the circular plate-shaped supporting plate 117 is fixed in the axial direction relative to the outer race 110. In the present embodiment, the supporting plate 117 and the retaining ring 118 constitute a second outer race-side roller abutting part 115b that abuts against the opposite end face of the rollers 150.

In the inner race 120 of the present embodiment, an outward flange part that protrudes radially outward and extends around the entire periphery in the circumferential direction is integrally formed on each of the axial end portions thereof, and the outward flange part on one end side constitutes a first inner race-side roller abutting part 125a that abuts one end face of the rollers 150 such that the rollers 150 are sandwiched in the axial direction between the second outer race-side roller abutting part 115b and the first inner race-side roller abutting part 125a. Also, the outward flange part on the opposite end side constitutes a second inner race-side roller abutting part 125b that abuts against the opposite end face of the rollers 150 such that the rollers 150 are sandwiched in the axial direction between the first outer race-side roller abutting part 115a and the second inner race-side roller abutting part 125b.

The cage ring 130 has the same configuration as the cage ring 130 in the cam clutch 100 according to the above first embodiment, and is configured to expose an outer race-side portion of the one end face of the rollers 150 and an inner race-side portion on the opposite end face of the rollers 150 in the axial direction, when the rollers 150 are housed in the roller pocket parts 136*b*.

One end portion of a small-diameter tubular part 133 of the cage ring 130 is disposed between the outer peripheral surface of the first inner race-side roller abutting part 125*a* and the inner peripheral surface of the first outer race-side roller abutting part 115*a*, and the opposite end portion of a large-diameter tubular part 131 of the cage ring 130 is disposed between the outer peripheral surface of the second inner race-side roller abutting part 125*b* and the inner peripheral surface of the supporting plate 117 constituting the second outer race-side roller abutting part 115*b*.

The first outer race-side roller abutting part 115*a* and the second inner race-side roller abutting part 125*b* are thereby respectively abutted against the one end face and the opposite end face of the rollers 150, so as to sandwich the rollers 150 in the axial direction, and the second outer race-side roller abutting part 115*b* and the first inner race-side roller abutting part 125*a* are thereby respectively abutted against the opposite end face and the one end face of the rollers 150, so as to sandwich the rollers 150 in the axial direction.

By adopting such a configuration, the space between the outer race 110 and the inner race 120 is effectively utilized, and it is possible for the rollers 150 to bear bidirectional axial load from the outer race 110 or the inner race 120 in a limited space.

In the present embodiment, an example was described in which the opposite end-side roller abutting part of the outer race is constituted by a supporting plate and a retaining ring, but the opposite end-side roller abutting part may be integrally formed with the outer race by being constituted by an inward flange part. Also, the one end-side roller abutting part of the outer race may be formed separately from the outer race by being constituted by a supporting plate provided so as to restrict axial movement with a retaining ring. This similarly applies to the roller abutting parts of the inner race, and the one end-side roller abutting part and/or the opposite end-side roller abutting part may be formed separately from the inner race by being constituted by a supporting plate provided so as to restrict axial movement with a retaining ring.

Furthermore, in the present embodiment, a configuration was described in which axial load is born by the flat end faces of the rollers, but axial load may be born obliquely by a surface that inclines to the axial direction, similarly to the cam clutch according to the first embodiment.

While embodiments of the present invention have been described in detail above, the present invention is not limited to the above embodiments, and various design changes can be made without departing from the invention described in the claims.

What is claimed is:

1. A cam clutch comprising:
    an outer race and an inner race provided to be relatively rotatable on a same axis;
    a plurality of cams and a plurality of rollers disposed so as to be arranged in a circumferential direction between the outer race and the inner race;
    a cage ring having a plurality of cam pocket parts corresponding one-to-one to the plurality of cams, and a plurality of roller pocket parts corresponding one-to-one to the plurality of rollers; and
    an annular spring biasing each of the plurality of cams so as to come into contact with the outer race and the inner race, and biasing each of the plurality of rollers so as to be pressed against the outer race or the inner race,
    wherein the cage ring is configured to hold the rollers in a state where an outer race-side portion of one axial end portion of the rollers protrudes radially outward with respect to an outer peripheral surface of the cage ring,
    the roller pocket parts are formed so as to hold the rollers in a state where both end portions of the rollers respectively protrude axially outward with respect to axial end faces of the cams held in the cam pocket parts, and
    a column part formed between adjacent pocket parts is formed such that an opposite axial end portion on an inner peripheral surface side thereof is located axially inward with respect to an opening edge position on an opposite axial end side of the roller pocket parts.

2. The cam clutch according to claim 1,
    wherein the outer race has an outer race-side roller abutting part that is formed on one axial end portion thereof so as to protrude radially inward and extend around an entire periphery in the circumferential direction, and that abuts against one end face of the rollers,
    the inner race has an inner race-side roller abutting part that is formed on an opposite axial end portion thereof so as to protrude radially outward and extend around the entire periphery in the circumferential direction, and that abuts against an opposite end face of the rollers, and
    one end portion of the cage ring is disposed between an inner peripheral surface of the outer race-side roller abutting part and an outer peripheral surface of the inner race, and an opposite end portion of the cage ring is disposed between an outer peripheral surface of the inner race-side roller abutting part and an inner peripheral surface of the outer race.

3. The cam clutch according to claim 1,
    wherein the outer race has an outer race-side roller abutting part that is formed on both axial end portions thereof so as to protrude radially inward and extend around an entire periphery in the circumferential direction, and that abuts against end faces of the rollers,
    the inner race has an inner race-side roller abutting part that is formed on both axial end portions thereof so as to protrude radially outward and extend around the entire periphery in the circumferential direction, and that abuts against end faces of the rollers, and
    one end portion and an opposite end portion of the cage ring are each disposed between an outer peripheral surface of the inner race-side roller abutting part and an inner peripheral surface of the outer race-side roller abutting part.

4. The cam clutch according to claim 2,
    wherein the outer race-side roller abutting part is constituted by an inward flange part integrally formed with the outer race, and
    the inner race-side roller abutting part is constituted by an outward flange part integrally formed with the inner race.

5. The cam clutch according to claim 4,
    wherein the rollers each have, on both end portions thereof, a chamfered part having a C-chamfered shape or an R-chamfered shape, and
    a roller contacting surface of the outer race-side roller abutting part and a roller contacting surface of the inner race-side roller abutting part are formed in a tapered shape or a circular arc cross-sectional shape.

6. The cam clutch according to claim 1,
    wherein the cage ring is made of a resin material.

* * * * *